United States Patent

Lundblad

[11] Patent Number: 6,126,366
[45] Date of Patent: Oct. 3, 2000

[54] CUTTING INSERT FOR CHIP-BREAKING MACHINING OF METALS

[75] Inventor: Mikael Lundblad, Gävle, Sweden

[73] Assignee: Sandvik AB, Sandviken, Sweden

[21] Appl. No.: 09/101,896

[22] PCT Filed: Jan. 23, 1997

[86] PCT No.: PCT/SE97/00116

§ 371 Date: Jul. 20, 1998

§ 102(e) Date: Jul. 20, 1998

[87] PCT Pub. No.: WO97/27019

PCT Pub. Date: Jul. 31, 1997

[30] Foreign Application Priority Data

Jan. 25, 1996 [SE] Sweden ................................ 9600266

[51] Int. Cl.[7] .................................................. B26D 1/00
[52] U.S. Cl. ........................ 407/102; 407/103; 407/113; 407/120
[58] Field of Search ..................... 407/113, 114, 407/115, 116, 102, 103, 95, 96, 104, 105

[56] References Cited

U.S. PATENT DOCUMENTS

| | | | |
|---|---|---|---|
| 3,636,602 | 1/1972 | Owen | 407/113 |
| 4,083,645 | 4/1978 | Friedline | 407/104 |
| 5,046,899 | 9/1991 | Nishi . | |
| 5,382,118 | 1/1995 | Satran et al. | 407/113 X |
| 5,441,370 | 8/1995 | Pantzar et al. | 407/113 |
| 5,443,334 | 8/1995 | Pantazar . | |
| 5,454,670 | 10/1995 | Noda et al. | 407/114 X |
| 5,779,401 | 7/1998 | Stallwitz et al. | 407/114 |
| 5,791,832 | 8/1998 | Yamayose | 407/113 |

FOREIGN PATENT DOCUMENTS

| | | | |
|---|---|---|---|
| 0 184 818 | 6/1986 | European Pat. Off. . | |
| 0019302 | 1/1987 | Japan | 407/104 |
| WO 94/15741 | 7/1994 | WIPO . | |

Primary Examiner—Henry W. H. Tsai
Attorney, Agent, or Firm—Burns, Doane, Swecker & Mathis, L.L.P.

[57] ABSTRACT

An indexible cutting insert for chip-breaking metal machining comprises an upper surface or chip surface, a lower bottom surface which is substantially plane parallel to the upper surface, and at least a side surface extending between the surfaces, which forms an acute angle with the upper surface and an obtuse angle with the bottom surface. The side surface has at least two bulging portions which are intended to function as support surfaces against the support surfaces in an insert seat.

6 Claims, 2 Drawing Sheets

CUTTING INSERT FOR CHIP-BREAKING MACHINING OF METALS

BACKGROUND OF THE INVENTION

1. Field of the Invention

The present invention relates to a cutting insert for chip-breaking metal machining being applicable for turning, milling and drilling. The cutting insert is normally made of coated or uncoated cemented carbide, but ceramic materials may also be used. It comprises an upper chip surface, a lower bottom surface, which is substantially plane parallel with the chip surface and which may be placed upon a cooperating bottom support surface of the holder, which for instance consists of a boring bar, a milling cutter body, an endmill or a drill. Further, the cutting insert comprises at least one side surface extending between said surfaces, which side surface has protruding portions according to claim 1.

2. Description of the Prior Art

Cutting inserts of cemented carbide for chip-breaking metal machining are conventionally shaped as so called indexable cutting inserts, i.e., one and the same cutting insert has two or more cutting edges, whereby it may be indexed when one cutting edge has worn out, so that a new unused cutting edge comes into operative engagement with the workpiece. The cutting insert is clamped in an insert seat in a holder, such as a milling cutter body or a boring bar. The most common way of clamping the insert is by a locking screw which is inserted through a through central aperture in the insert. However, other clamping arrangements do also occur, such as different clamps, central pins and lever pins. Inserts with a polygon basic shape, e.g., such as square, rectangular, triangular, rhombic and rhomboidic inserts, normally bear in an insert seat on one hand against a bottom support surface and on the other hand against two (exceptionally one) support surfaces, which bear against cooperating side surfaces of the insert. For square and rectangular inserts, said two support surfaces are normally perpendicular to each other, but, e.g., for triangular and hexagonal cutting inserts, the support surfaces normally have correspondingly other internal angles.

In order to be accomodated in an absolutely stable and fixed position, it is required that the support and side surfaces that bear against each other shall be entirely planar and that the support and side surfaces, respectively, have exactly the same internal angle. In practice, this has turned out to be very difficult to achieve and in principle this requires a careful grinding of both pairs of cooperating surfaces, which raises the production costs in a non-desirable way. In order to avoid this, it has been suggested to provide protruding support points or portions on the support surfaces, whereby only these then abut against the side surfaces of the insert, see for instance U.S. Pat. No. 5,443,334 (in particular FIG. 5). Of the same reason that a stool always stands firmly when it has three legs, the number of support points is three, which thus gives a statically well defined bearing (isostatic system). However, it is complicated and costly to shape the insert seat with such bearing points, inter alia because very small end mills have to be used.

Corresponding difficulties are also encountered for round cutting inserts. Thus, it is very difficult to attain two perfectly round surfaces with the same radius with an uninterrupted bearing along a large circle sector. Therefore, also in this case one normally shapes the round support surface of the insert seat with two bearing points, against which the round side surface of the insert bears in an isostatic way. Also in this case, corresponding difficulties arise to produce the round support surface of the insert seat.

SUMMARY OF THE INVENTION

Thus, a primary object of the present invention is to bring about a statically well defined bearing between insert and insert seat, with largest precision.

A second object of the present invention is to achieve this bearing with the smallest possible production cost.

These and further objects have been accomplished by shaping the insert with the features as defined in the characterizing part of claim 1.

BRIEF DESCRIPTION OF THE DRAWINGS

For illustrative but non-limiting purposes, some preferred embodiments of the invention will now be described in more detail with reference to the appended drawings. These are herewith briefly presented. It is pointed out that by "vertical" and "horizontal", respectively, those planes are intended which correspond to these terms when the insert lies with its bottom surface on a planar, horizontal support.

DETAILED DESCRIPTION OF THE PREFERRED EMBODIMENTS

Figure 1:
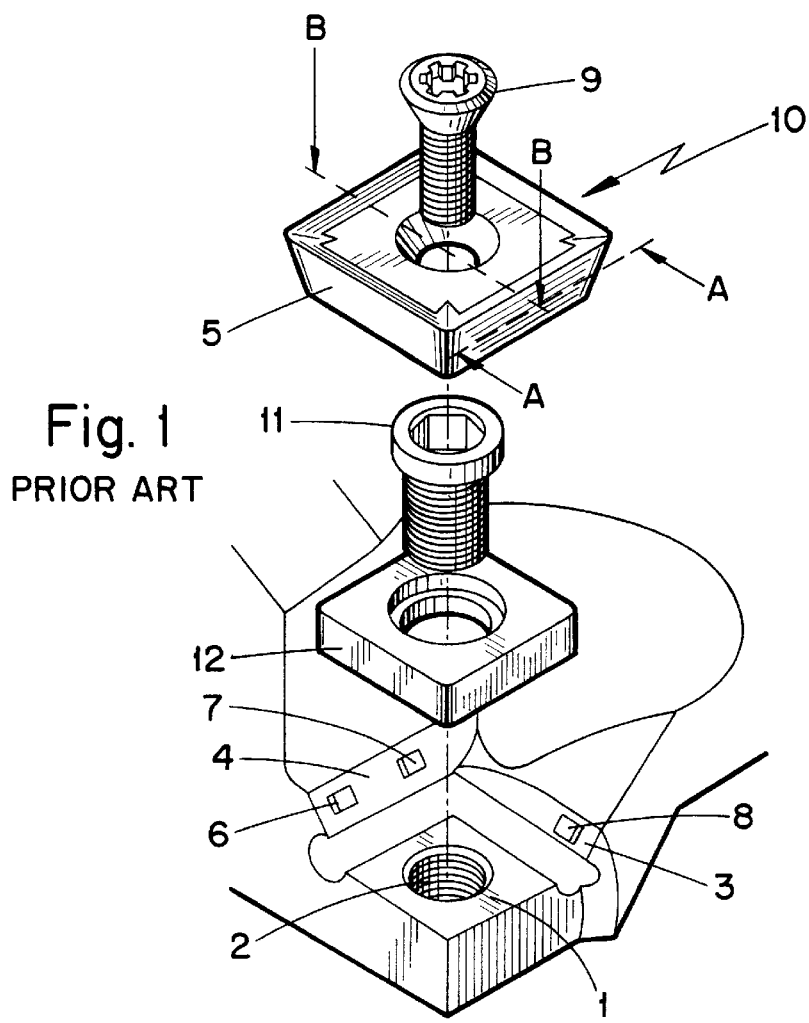
FIG. 1 shows an exploded view of a cutting insert corresponding prior art, in a perspective obliquely from above.

FIG. 1 shows an insert seat according to prior art. The insert seat comprises a bottom support surface 1 with a threaded central hole 2 and two support or bearing surfaces 3 and 4, respectively. These support surfaces are either wholly planar for abutment against side surfaces 5 of the indexable cutting insert 10, or the support surfaces 3 and 4 are shaped with protruding portions 6, 7 and 8, e.g., as shown in U.S. Pat. No. 5,443,334, only these functioning as support for the insert and, thereby, enabling an isotactic bearing against the insert. Thus, e.g. four support portions would render the abutment over-determined and two would render it under-determined.

A shim 12 is fastened by a screw on the bottom support surface 1 by means of a shim screw 11, which is tightened into the hole 2. The indexable cutting insert 10 is clamped by means of a locking screw 9, which is tightened into the inner thread of the shim screw 11. However, it should be noted that the shim is not an essential feature of the present invention. Thus, it may be dispensed with, whereby also the shim screw 11 becomes obsolete and the locking screw 9 is directly screwed into the threaded hole in the bottom support surface.

Figure 2:
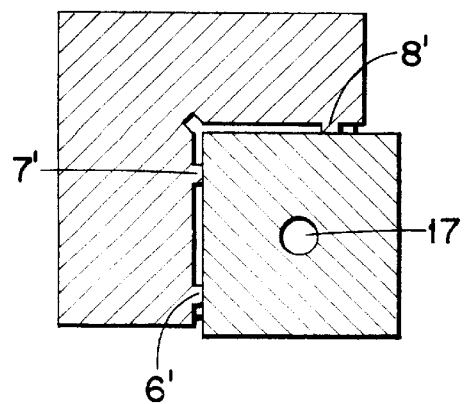
FIG. 2 shows a basic sketch of a horizontal cross-section through the centre of an insert, mounted in an insert seat, according to prior art; i.e., cross-section A—A in FIG. 1, however with the insert mounted.

FIG. 2 shows a formalized picture of an insert seat according to prior art, analogously to FIG. 1. The three protruding support portions 6, 7 and 8 are illustrated by the three projections 6'. 7' and 8'. The central hole for the locking screw is designated 17.

Figure 3:
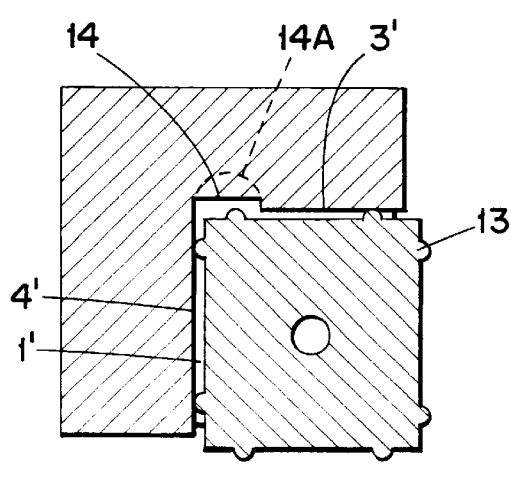
FIG. 3 shows a corresponding section through an insert and an insert seat according to the present invention.

In order to avoid the difficulties when manufacturing the surfaces 3, 4 with the support portions 6, 7 and 8, the indexable cutting insert is shaped according to the present invention in a way that is illustrated in FIG. 3. According to this, the protruding portions 6, 7 and 8 in the support surfaces of the insert seat have been replaced by corresponding protruding portions 13 on the side surfaces 5 of the cutting insert per se. The bottom support surface 1' glimpses in the gap between the insert and the support surfaces of the insert seat. In order to obtain the desired three point abutment for a substantially square insert, the insert seat may be provided with a recess 14 at the inner corner of the support surfaces 3, and 4', so that one of the protruding portions 13 goes free. Alternatively to the recess 14, two opposed side surfaces 5 may be provided with a centrally located bulging 13. For rectangular inserts, the two short sides may be provided with a bulging, which then suitably is arranged closer to the non-shown operative cutting corner. Also for rhombic and rhomboidic inserts with two operative cutting corners, two opposed side surfaces of the respective parallelogram may be provided with only one bulging, which is then distanced from the respective operative cutting corner. Due to production-technical reasons, the recess 14 may also have circle segment- or semi-circle-shaped cross-section, as being indicated by the broken line 14A.

Figure 4:
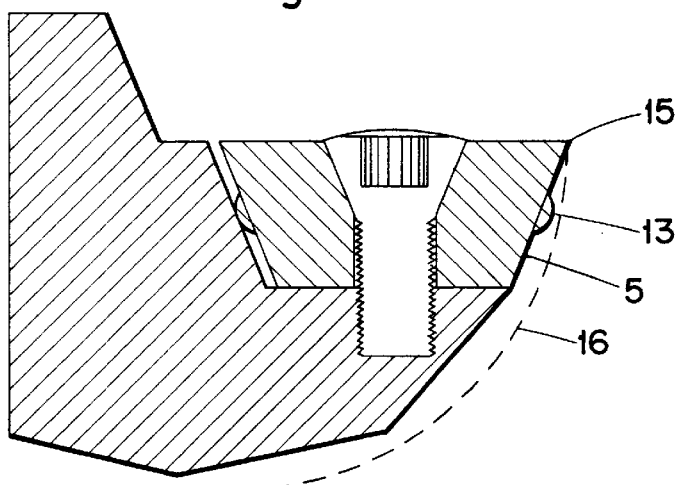
FIG. 4 shows a vertical section corresponding to section B—B in FIG. 1, though of an insert according to the invention mounted in an insert seat.

FIG. 4 shows a vertical central section through an insert seat according to the invention. Here it may be seen how the positive geometry of the insert makes it possible that the bulging 13 according to the invention goes free under the cutting edge, i.e. they are safely within the clearance, which is illustrated by the line 16.

Figure 5:
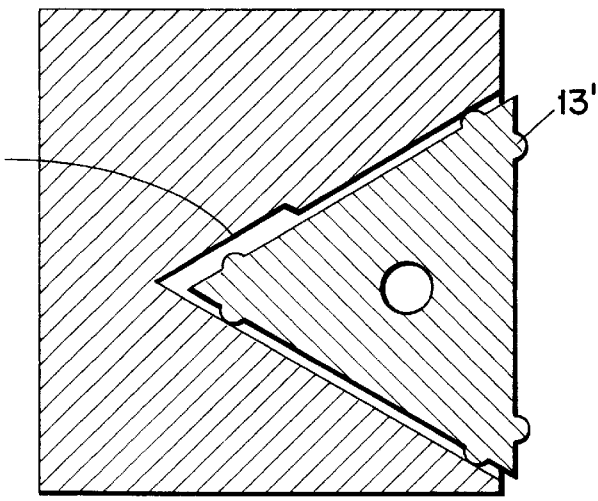
FIG. 5 shows a horizontal section analogous to FIG. 3 of a triangular cutting insert.

Analogously to FIG. 3, FIG. 5 shows how the present invention may also be applied on inserts with a triangular basic shape. In the same way as in FIG. 3, each side surface has two bulgings 13'. In order to avoid a statically overdetermined four point abutment, a recess 14' is provided in the insert seat, so that no abutment arises for the protruding portion 13', which faces said recess.

Figure 6:
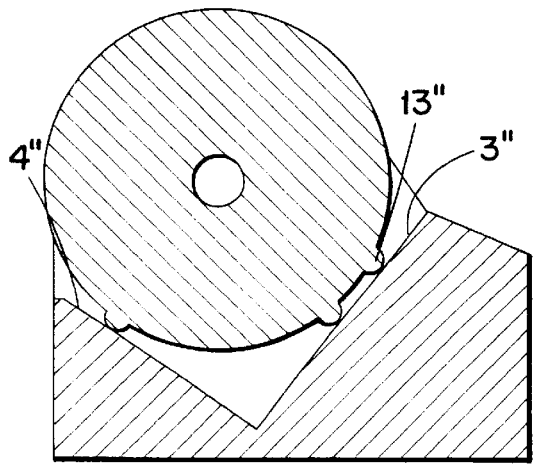
FIG. 6 shows a horizontal section analogous with FIG. 3 of a round insert.
Figure 7:
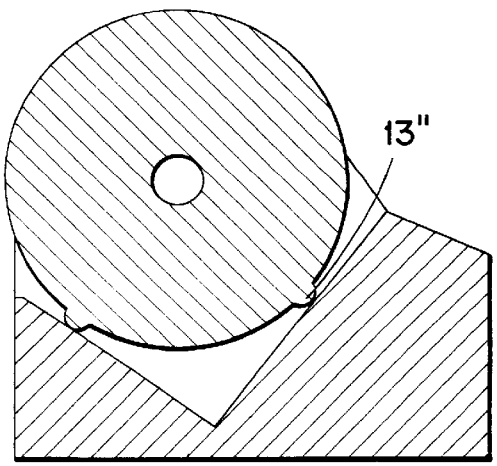
FIG. 7 shows a modification of the insert and the section according to FIG. 6.

The present invention may also be applied on round inserts, as illustrated in FIGS. 6 and 7. Here, three point abutment may be accomplished by providing three bulgings 13" on the round side surface of the insert. However, for round inserts a two point abutment is sufficient, wherefore the bulgings 13" may also be shaped as illustrated in FIG 7. Of course, the round inserts according to FIGS. 6 and 7 may be shaped with more bulgings 13" than what is drawn in these figures. Thus, the insert may for instance be shaped with a plurality, such as between 4 and 12, of equidistantly placed bulgings around the side surface, which enables a well defined possibility of indexing the insert in equally many cutting positions.

In FIG. 4 a positive cutting insert has been depicted, i.e., an insert whose side surfacers 5 form an acute angle to the upper surface of the insert and an obtuse angle to its bottom surface. However, the invention is equally applicable on neutral inserts, where the side surfaces 5 are substantially perpendicular to the top and bottom surfaces.

The bulgings or support points 13, 13', 13" may be shaped in many different ways, such as "bumps", parts of spheres, ellipsoids or other protrusions with a planar or convex abutment surface. However, in order to make possible the desired, distinct bearing, the protrusions with a planar abutment surface should not have too a large extension. A suitable limit for the maximal extension of a planar abutment surface is 2.5 mm, preferably 2.0 mm. Further, they may be somewhat extended horizontally, such as parts of cylinders, which gives a shorter line-shaped abutment rather than a point abutment.

By the present invention a number of advantages has been obtained. By the fact that no bulging support portions are required on the support surfaces of the insert seat, these are very simple to manufacture as planar surfaces. Thereby, they may be machined by stronger tools, which are bent to a lesser extent and have higher productivity, without deteriorating the accuracy.

Furthermore, the bulging portions according to the invention may be ground, in order to reduce the tolerance widths as far as possible when positioning the inserts functionally in an insert seat of a holder. Thereby, the surface to be ground is of course much smaller than on conventional inserts with planar side surfaces. The bulgings according to the invention may be directly sintered or injection-moulded when the insert is manufactured, wherefore no further production stage is needed for their production.

What is claimed is:

1. A cutting insert for chip-breaking metal machining comprising an upper surface or chip surface, a lower bottom surface, which is substantially plane parallel to the upper surface, a bore extending through said surfaces, and at least one side surface extending between said surfaces, said at least one side surface having a longitudinal direction which is orthogonal to a central axis of the bore of said insert, said at least one side surface either forms an acute angle to the upper surface and an obtuse angle to the bottom surface, or is substantially perpendicular to the upper and bottom surfaces, wherein the at least one side surface has at least two bulging portions which are intended to function as insert support surfaces against seat support surfaces in an insert seat, and wherein a total length of said two bulging portions measured longitudinally along the at least one side surface is less than a total length of non-bulging portions of the at least one side surface measured longitudinally along the at least one side surface.

2. The cutting insert according to claim 1, wherein the insert support surface of the bulging portion is located closer to the center of the insert than a cutting edge located above said portion.

3. The cutting insert according to claim 1, wherein it has a polygonal basic shape and that each side surface comprises two bulging portions.

4. The cutting insert according to claim 3, wherein each bulging portion is arranged in proximity to a corner of said insert.

5. The cutting insert according to claim 1, wherein it has a square, rectangular, triangular, rhombic, rhomboidic, hexagonal or round basic shape.

6. A holder for the accommodation of an insert for chip-breaking metal machining, the holder comprising at least an insert seat with a bottom support surface and two support surfaces which form a corner with each other, the insert being intended to be accommodated by the holder having a polygonal basic shape and having bulging portions in accordance with claim 1 wherein, in connection with the corner between said two seat support surfaces there is a recess in one of said seat support surfaces, so that one of the bulging portions of the insert goes free.

* * * * *